(12) United States Patent
Thompson (10) Patent No.: US 6,676,582 B1
(45) Date of Patent: Jan. 13, 2004

(54) BELT PRESSURE ROLLER

(75) Inventor: James E. Thompson, Montgomery County, TX (US)

(73) Assignee: Ashbrook Corporation, Houston, TX (US)

( * ) Notice: Subject to any disclaimer, the term of this patent is extended or adjusted under 35 U.S.C. 154(b) by 0 days.

(21) Appl. No.: 09/479,044

(22) Filed: Jan. 7, 2000

(51) Int. Cl.[7] .............................................. F06C 13/00
(52) U.S. Cl. ...................................... 492/47; 29/895.22
(58) Field of Search ........................... 492/47, 16, 48; 100/151, 152; 474/190; 193/37; 464/184; 29/895.22

(56) References Cited

U.S. PATENT DOCUMENTS

| | | | | |
|---|---|---|---|---|
| 142,364 A | * | 9/1873 | Amsden ........................ 492/47 |
| 243,897 A | * | 7/1881 | Hill ............................ 464/184 |
| 874,267 A | | 12/1907 | Wagner | |
| 902,736 A | * | 11/1908 | Jennings ...................... 193/37 |
| 1,092,464 A | | 4/1914 | Watson et al. | |
| 1,222,943 A | | 4/1917 | Gammeter | |
| 1,709,581 A | * | 4/1929 | Johnson ....................... 137/194 |
| 1,718,977 A | * | 7/1929 | Overton .................. 29/895.22 |
| 1,872,062 A | | 8/1932 | Burke | |
| 2,156,395 A | | 5/1939 | Klouman ........................ 263/6 |
| 2,542,287 A | | 2/1951 | Neubauer ..................... 34/124 |
| 3,138,848 A | * | 6/1964 | Cheney ........................ 29/123 |
| 3,217,554 A | * | 11/1965 | Stalker ...................... 74/230.3 |
| 3,391,638 A | * | 7/1968 | Ebneter ....................... 101/407 |
| 3,610,643 A | * | 10/1971 | Thompson ................. 279/2.12 |
| 3,994,053 A | * | 11/1976 | Hunt ............................ 29/123 |
| 4,040,157 A | * | 8/1977 | Shanly ......................... 29/123 |
| 4,071,081 A | * | 1/1978 | Chielens et al. ............. 165/82 |
| 4,086,957 A | * | 5/1978 | Schrewe et al. ............. 165/89 |
| 4,399,169 A | | 8/1983 | McGowan .................. 427/284 |
| 4,607,420 A | * | 8/1986 | Vomhoff ........................ 492/5 |
| 4,642,862 A | * | 2/1987 | Muhle et al. ................ 492/53 |
| 4,823,160 A | * | 4/1989 | Ikuta et al. ................. 399/117 |
| 4,836,100 A | | 6/1989 | Johnson et al. ............ 100/118 |
| 4,890,372 A | | 1/1990 | Halttula ....................... 29/123 |
| 5,133,125 A | | 7/1992 | Diebels et al. ............ 29/527.2 |
| 5,146,675 A | | 9/1992 | Ford et al. .................... 29/123 |
| 5,151,737 A | * | 9/1992 | Johnson et al. ............. 355/211 |
| 5,229,813 A | | 7/1993 | Cherian ...................... 355/200 |
| 5,322,517 A | * | 6/1994 | Sircom et al. .............. 604/198 |
| 5,336,077 A | | 8/1994 | Gerhardt ..................... 425/371 |
| 5,469,619 A | | 11/1995 | Renck ........................ 29/895.2 |
| 5,611,781 A | * | 3/1997 | Sircom et al. .............. 604/164 |
| 5,675,893 A | | 10/1997 | Yamada et al. .......... 29/895.22 |
| 6,044,556 A | * | 4/2000 | Petitfrere et al. .......... 29/895.3 |
| 6,139,478 A | * | 10/2000 | Viaud et al. ................. 492/47 |
| 6,293,894 B2 | * | 9/2001 | Viaud et al. ................. 492/47 |

FOREIGN PATENT DOCUMENTS

EP      0086524 A2 * 8/1986 ............. B30B/3/04

* cited by examiner

*Primary Examiner*—Gregory Vidovich
*Assistant Examiner*—Marc Jimenez
(74) *Attorney, Agent, or Firm*—Webb Ziesenheim Logsdon Orkin & Hanson, P.C.

(57) ABSTRACT

A belt roller for belt filter presses having a roller body and two end pieces. Each end piece has a thickened portion positioned adjacent a center of the end piece. The thickened portion can resemble a variety of shapes when viewed in cross-section.

17 Claims, 7 Drawing Sheets

BELT PRESSURE ROLLER

BACKGROUND OF THE INVENTION

1. Field of the Invention

The present invention relates to rollers and, more particularly, to rollers for belt filter presses.

2. Brief Description of the Prior Art

Rollers are used in a variety of applications. For example, U.S. Pat. No. 4,399,169 to McGowan discloses a roller for use in paper drying machines having insulated end caps. U.S. Pat. No. 1,872,062 to Burke and U.S. Pat. No. 2,156,395 to Klouman each disclose rollers used in heat treating furnaces.

Figure 1:
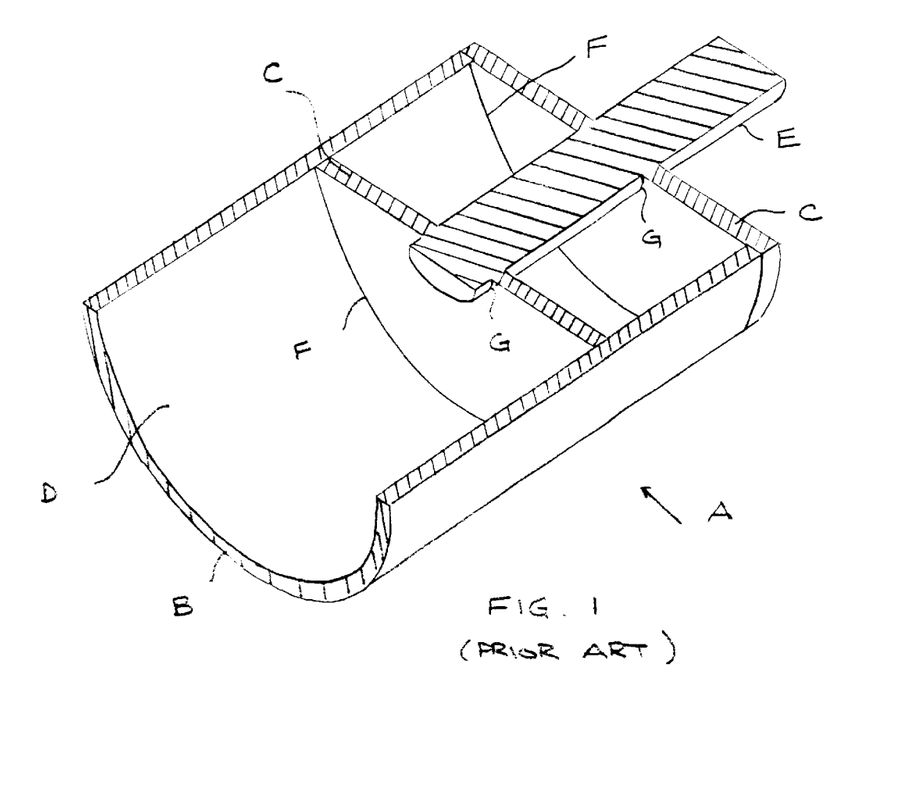
FIG. 1 is a top cross-sectional view of a prior art belt press roller.

In the belt press roller art, the most prevalent type of roller used is shown in FIG. 1. The roller A typically has a cylindrical hollow body B made from steel. A pair of end pieces C are welded at each opposing end of the body B to an interior surface D of the body B. A cylindrical shaft E is welded to the end piece C parallel to the interior surface D of the body B and perpendicular to each end piece C.

The belt press roller design shown in FIG. 1 is not without its deficiencies, however. First, the roller A requires four end pieces C, two at each opposing end of the roller body B, due to the stresses placed on the roller A during operation. This results in higher material and manufacturing costs. Second, because internal, non-linear welds F, G are needed to attach the various parts together, there is a demonstrated increased probability that the welds F attaching the end pieces C to the interior surface D of the body B and the welds G attaching the shaft E to the end pieces C will fail during operation of the roller A. The most common problem is a failure of the welds G connecting the end pieces C to the shafts E because the welds G adjacent the shafts E are subjected to higher stresses than the welds F positioned adjacent the end pieces C and the interior surface D of the roller body B.

SUMMARY OF THE INVENTION

To obviate the problems associated with the prior art rollers, the present invention generally includes a roller body having two opposing ends, with an end piece connected to each opposing end of the roller body. Each end piece has a first side, a second side, a center portion, and a rim, wherein the second side of each end piece forms a thickened portion that preferably tapers or otherwise becomes thinner in a direction away from the center portion of each end piece toward the rim of each end piece. The rim can be extended toward the roller body, allowing different shapes.

The roller body preferably forms an internal hollow cavity, is cylindrical in shape, and may extend about a longitudinal axis. A first shaft is positioned perpendicularly adjacent to the center portion of the first side of one of the two opposing solid end pieces, and a second shaft is positioned perpendicularly adjacent to the first side of the other one of the two opposing solid end pieces. The first shaft and the second shaft each extend about the longitudinal axis of the roller body, and are preferably formed integrally with the first side of each end piece.

The thickened portion on the second side of each end piece extends into the hollow cavity and is symmetric about the longitudinal axis of the roller body, but the thickened portion does not contact the cylindrical roller body, and the thickened protrusions are not connected to each other. The thickened portion can form a number of different shapes (seen when an end piece is cut by an imaginary plane passing through the center portion of the end piece, perpendicular to the second side of the end piece). The thickened portion provides more material in the area of highest stress while dissipating toward the rim of the end piece, which is the area of lower stress.

It is therefore an object of the present invention to provide a roller that is less expensive to manufacture and eliminates welds near the area of the roller subjected to the greatest amount of stress.

These and other advantages of the present invention will be apparent in the Detailed Description of the Preferred Embodiments taken together with the attached drawings in which like reference numerals represent like elements throughout.

DETAILED DESCRIPTION OF THE PREFERRED EMBODIMENTS

A typical belt filter press with rollers is shown in U.S. Pat. No. 4,836,100 issued to Johnson et al., herein incorporated by reference.

Figure 2:
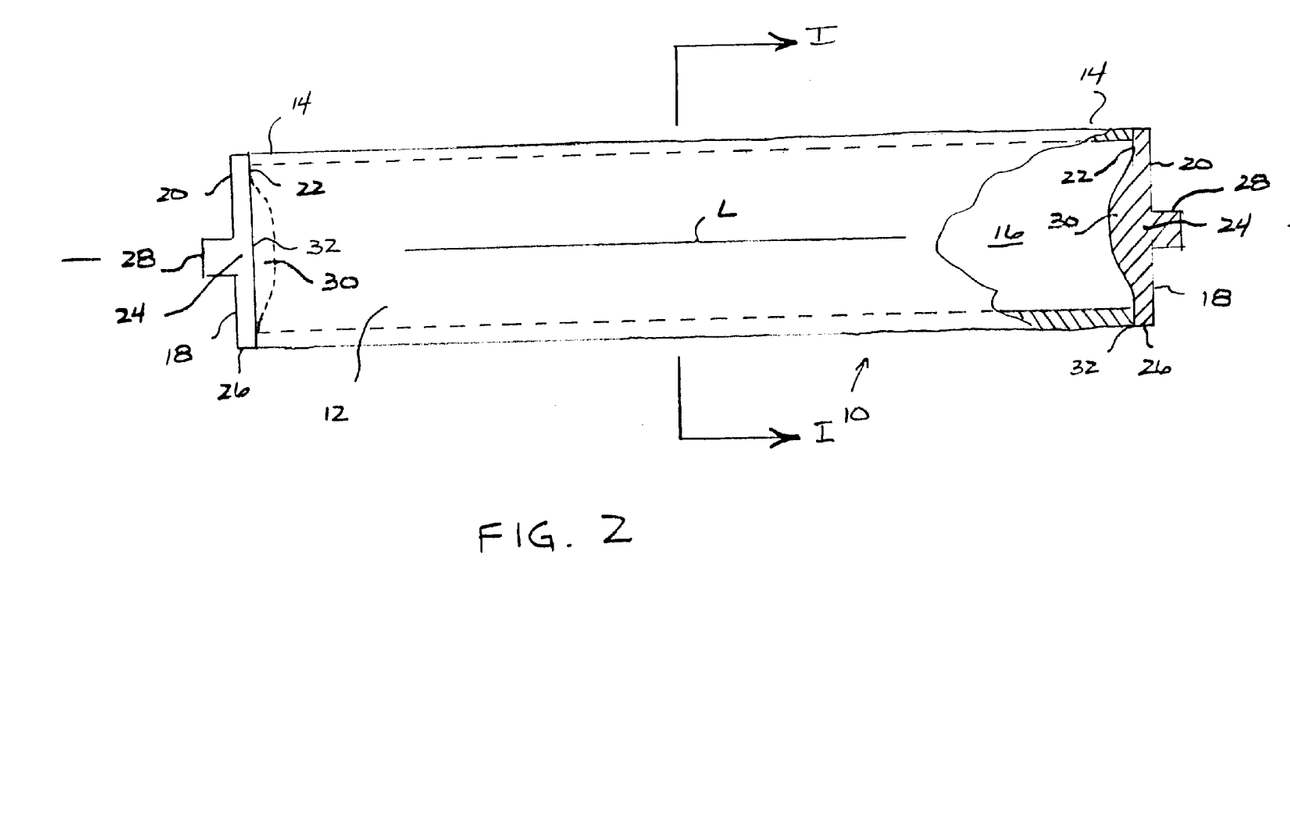
FIG. 2 is a partial cross-sectional side view of one embodiment of a belt press roller according to the present invention.

FIGS. 2–5 show one embodiment of a belt press roller 10 according to the present invention. Referring to FIG. 2, the belt press roller 10 has a roller body 12 having two opposing ends 14. The roller body 12 preferably is cylindrical in shape, extends about a longitudinal axis L, and forms an internal hollow cavity 16. Further, the roller body 12 is preferably made from metal, such as steel or other suitable material.

Figure 3:
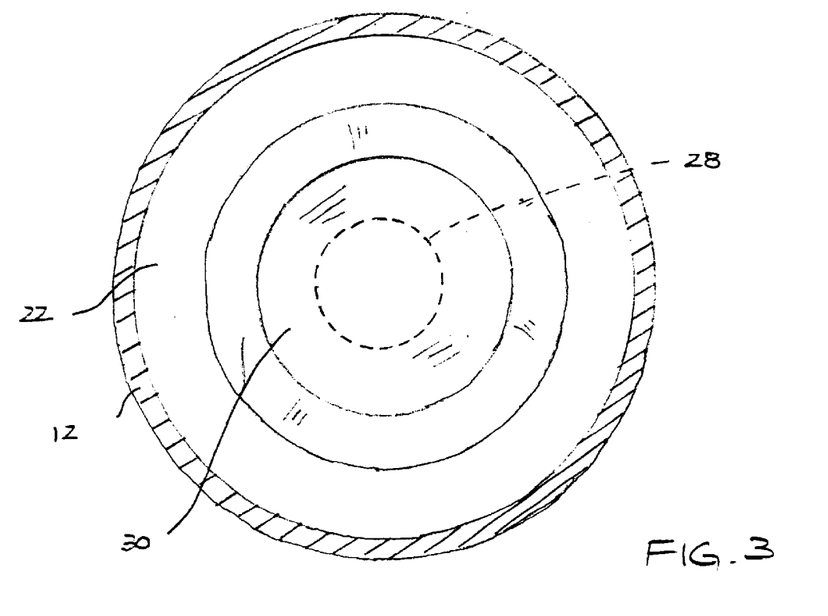
FIG. 3 is a sectional view of the belt press roller shown in FIG. 2 taken along lines I—I.
Figure 4:
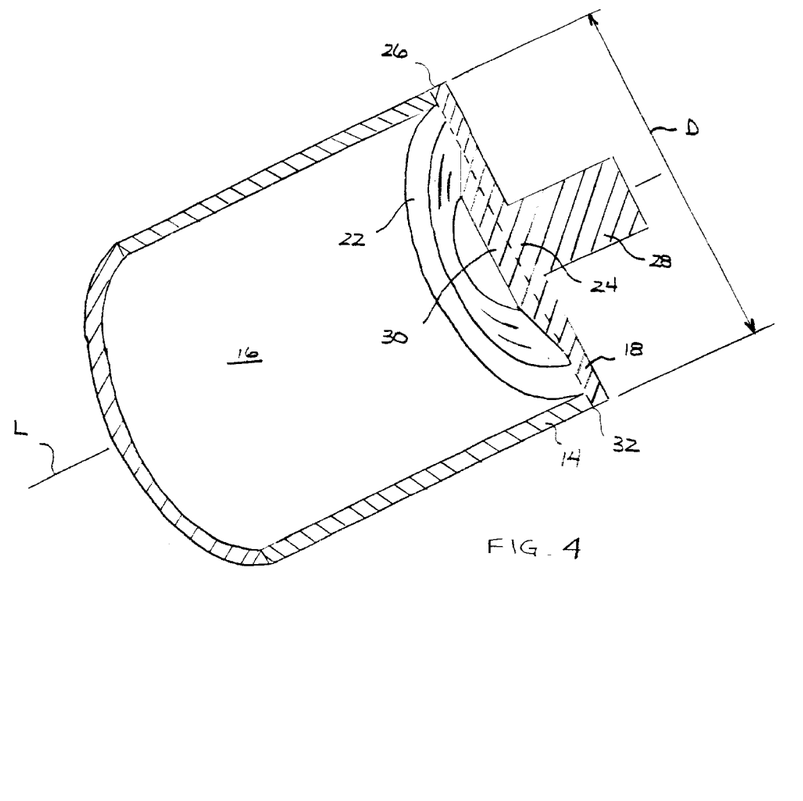
FIG. 4 is a cross-sectional view of one end piece of the belt press roller shown in FIGS. 2 and 3, wherein the end piece has a trapezoidal cross-sectional shape.
Figure 5:
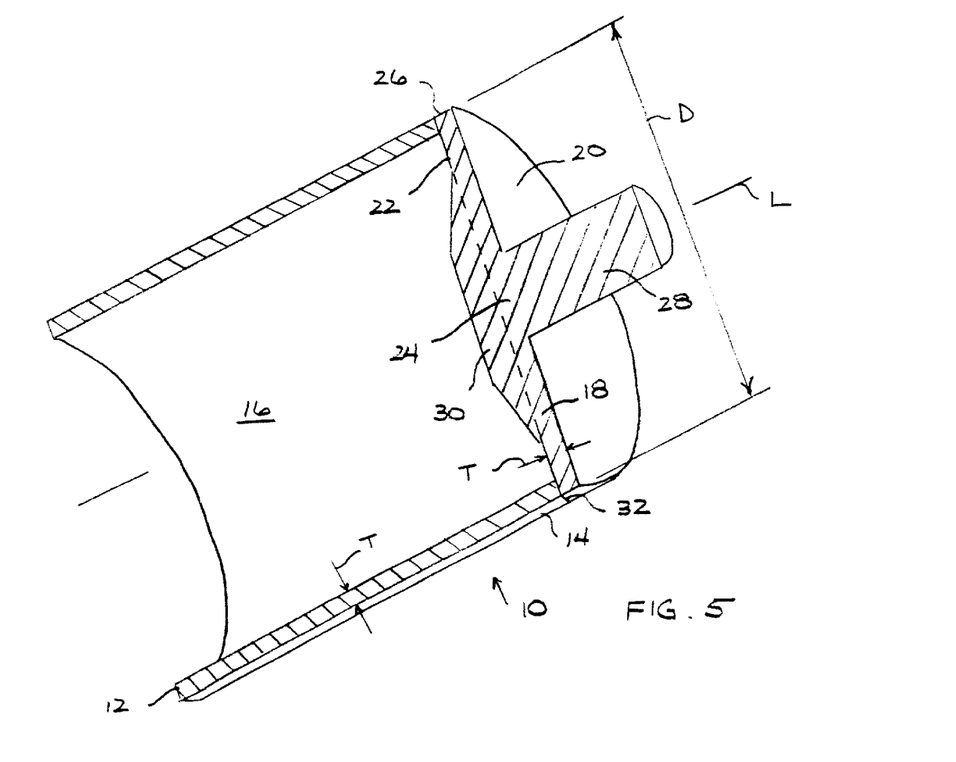
FIG. 5 is a second cross-sectional view of the end piece shown in FIG. 4.
Figure 8:
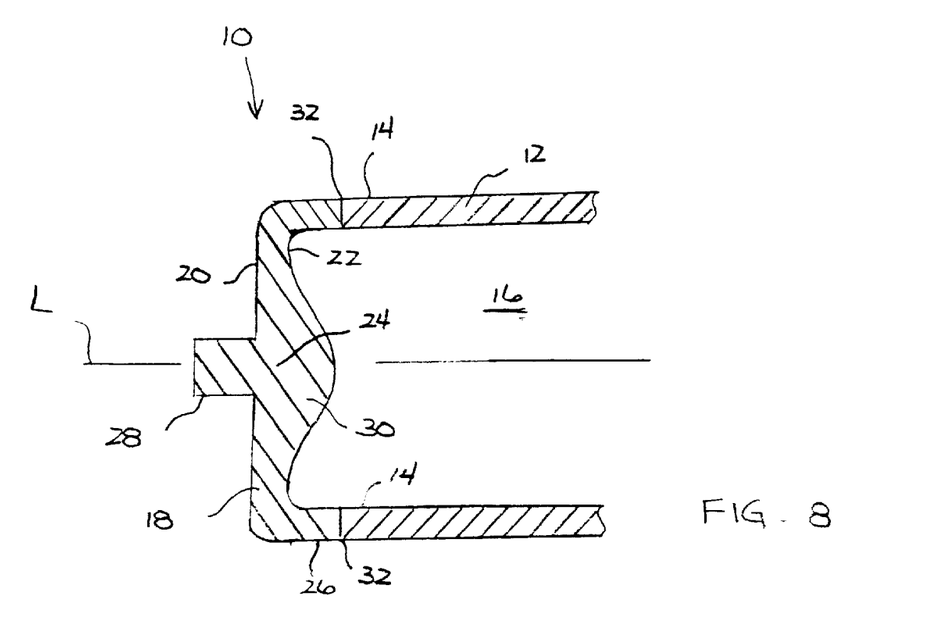
FIG. 8 is a side cross-sectional view of an end piece having an extended rim.

An end piece 18, shown in detail in FIGS. 3–5, is connected to each of the opposing ends 14 of the roller body 12. Each end piece 18 has a first side 20 and a second side 22, a center portion 24, and a rim 26. A shaft 28 is positioned perpendicularly adjacent the center portion 24 of the first side 20 of each end piece 18 and also extends about the longitudinal axis L of the roller body 12. The shaft 28 is preferably formed integrally with the first side 20 of each end piece 18. The rim 26 can also be extended toward said roller body 12, such as the rim 26' formed by end piece 18' in FIG. 8, to allow the end pieces 18 to be made into additional suitable shapes. The end pieces 18 and the shafts 28 are preferably made from metal, such as steel, or other suitable material.

Figure 6:
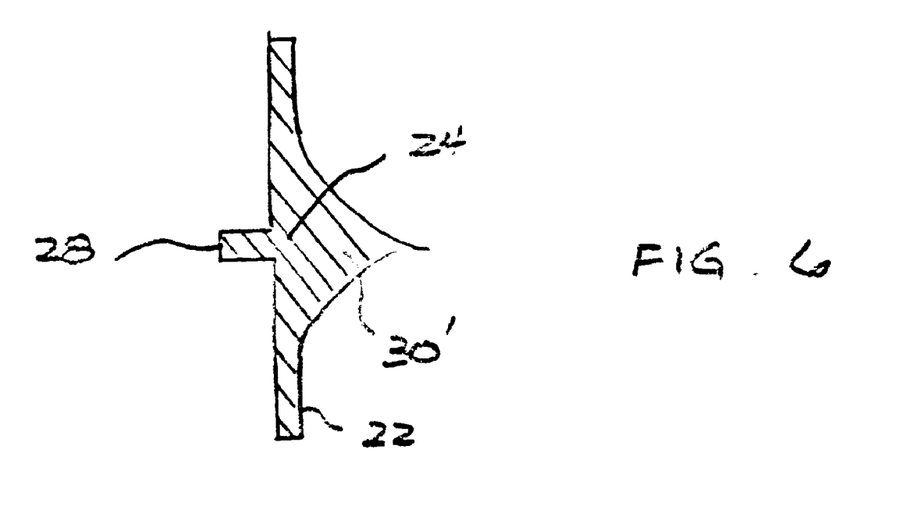
FIG. 6 is a cross-sectional view of a second embodiment having a conical end piece.
Figure 7:
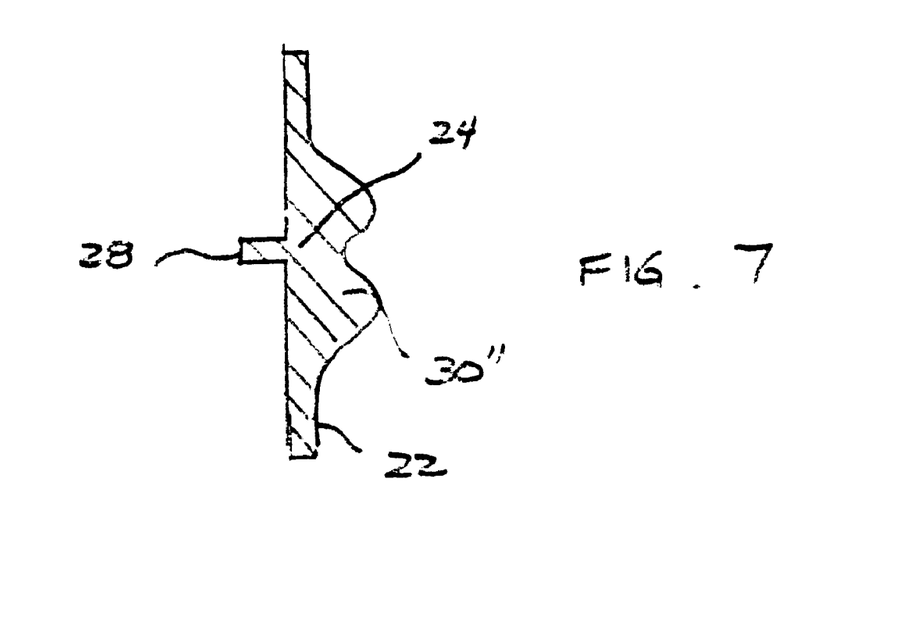
FIG. 7 is a cross-sectional view of a third embodiment having a sinusoidal end piece.

As shown in FIG. 5, the second side 22 of each end piece 18 forms a thickened portion 30 that is preferably symmetric about the longitudinal axis L of the roller body 12. The thickened portion 30 preferably tapers away from the center 24 toward the rim 26, but tapering is not required. Tapering helps reduce material costs and helps to make the rim 26 the same thickness T as the roller body 12. As shown in FIGS. 4 and 5, the thickened portion 30 preferably forms a trapezoidal shape when the end piece 18 is viewed in longitudinal cross-section. However, as shown in FIGS. 6 and 7, the thickened portion 30 can also resemble conical 30', sinusoidal 30", or other suitable cross-sectional shapes.

Referring back to FIG. 2, the second side 22 of each end piece 18 faces a corresponding opposing end 14 of the roller body 12 and may extend into the internal cavity 16 of the roller body 12. Each end piece 18 is connected to the roller body 12 by an external weld 32 or other suitable connectors. This configuration is easier to manufacture and assemble since all of the welds 32 are external. Moreover, difficult internal welds are eliminated.

In sum, the thickened portion 30 of the second side 22 of each end piece 18 adds more material to the area of the roller 10 under the most stress, the center portion 24 of the end pieces 18. Less material is used where the roller 10 is subjected to a lower amount of stress, such as the rims 26 of the end pieces 18, thus reducing material costs. Because the end pieces 18 are connected to the roller body 12 by external welds 32, the probability of stress cracks or manufacturing defects is reduced. Finally, each end piece 18 can be increased in diameter D without substantially increasing the length of the corresponding shafts 28.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A belt roller comprising:
    a cylindrical roller body having an internal hollow cavity;
    two opposing solid end pieces, each end piece connected to one end of said cylindrical roller body, each end piece having a first side carrying a shaft therewith, a second side, a center portion, and a rim; and
    a pair of non-uniform solid thickened portions each positioned directly on said center portion of said second side of each of said two opposing solid end pieces and each integrally formed with said second side of a corresponding one of said opposing solid end pieces,
    wherein the solid thickened portions each extend into the internal hollow cavity of the cylindrical roller body but do not contact said cylindrical roller body and are not connected to one another, and
    each of said two opposing end pieces physically contacts said cylindrical roller body only at an intersection between said rim of each opposing end piece and a respective one end of said cylindrical roller body.

2. The belt roller as claimed in claim 1 wherein said hollow cavity extends from one end piece to the opposing end piece.

3. The belt roller as claimed in claim 1 wherein said roller body is made from metal.

4. The belt roller as claimed in claim 3 wherein said metal is steel.

5. The belt roller as claimed in claim 1 wherein said rim is the same thickness as the roller body.

6. The belt roller as claimed in claim 1 wherein said thickened portion forms a shape selected from a group consisting of trapezoidal, conical, and sinusoidal when said end piece is viewed in longitudinal cross-section.

7. The belt roller as claimed in claim 1 wherein said thickened portion is symmetric about a longitudinal axis of said roller body.

8. The belt roller as claimed in claim 1 wherein the rim is extended toward said roller body.

9. The belt roller as claimed in claim 1 wherein each end piece is connected to an end of the roller body by a continuous weld.

10. The belt roller as claimed in claim 1 wherein said shaft is positioned perpendicularly adjacent a center portion of said first side of each end piece, said shaft also extending about the longitudinal axis of said roller body.

11. The belt roller as claimed in claim 10 wherein said shaft is made from metal.

12. The belt roller as claimed in claim 11 wherein said metal is steel.

13. The belt roller as claimed in claim 1 wherein said end pieces are made from metal.

14. The belt roller as claimed in claim 13 wherein said metal is steel.

15. In a belt filter press roller, the improvement comprising:
    a cylindrical roller body having two opposing ends, forming a hollow cavity, and extending along a longitudinal axis;
    two opposing solid end pieces each connected to one end of said roller body, each solid end piece having a first side, a second side, a center portion, and a rim, said first side of one of the two opposing end pieces forming a first integral shaft symmetric about the longitudinal axis of said cylindrical roller body and said first side of another one of said two opposing solid end pieces forming a second integral shaft symmetric about the longitudinal axis of said cylindrical roller body, .and each said second side of said two opposing solid end pieces forming respective non-uniform solid thickened portions that are positioned directly on said center portion of said second side of each of said two opposing solid end pieces and are symmetric about the longitudinal axis of said cylindrical roller,
    wherein said solid thickened portions become thinner in a direction away from said center portion toward the rim, said solid thickened portions extend into the internal hollow cavity of the cylindrical roller body but do not contact the cylindrical roller body and are not connected to each other, and each of said two opposing end pieces is physically connected to said cylindrical roller body only at an intersection between said rim of each said two opposing end pieces and a respective one end of said cylindrical roller body.

16. The belt roller as claimed in claim 15 wherein said thickened portion forms a shape selected from a group consisting of trapezoidal, conical, and sinusoidal when said end piece is viewed in longitudinal cross-section.

17. The belt roller as claimed in claim 15 wherein the rim is extended toward said roller body.

* * * * *

UNITED STATES PATENT AND TRADEMARK OFFICE
CERTIFICATE OF CORRECTION

PATENT NO. : 6,676,582 B1
DATED : January 13, 2004
INVENTOR(S) : James E. Thompson It is certified that error appears in the above-identified patent and that said Letters Patent is hereby corrected as shown below:

<u>Title page,</u>
Item [54], Title, "PRESSURE" should read -- PRESS --.

Signed and Sealed this

First Day of June, 2004

JON W. DUDAS
*Acting Director of the United States Patent and Trademark Office*